US009457862B2

(12) United States Patent
Neerman

(10) Patent No.: US 9,457,862 B2
(45) Date of Patent: Oct. 4, 2016

(54) SUPPORT SYSTEM AND CYCLE EQUIPPED WITH THE SUPPORT SYSTEM

(71) Applicant: N.G.M. SPRL, Kortrijk (BE)

(72) Inventor: Johan Neerman, Kortrijk (BE)

(73) Assignee: N.G.M. SPRL, Kortrijk (BE)

( * ) Notice: Subject to any disclaimer, the term of this patent is extended or adjusted under 35 U.S.C. 154(b) by 0 days.

(21) Appl. No.: 14/774,679

(22) PCT Filed: Mar. 10, 2014

(86) PCT No.: PCT/IB2014/059586
§ 371 (c)(1),
(2) Date: Sep. 10, 2015

(87) PCT Pub. No.: WO2014/141039
PCT Pub. Date: Sep. 18, 2014

(65) Prior Publication Data
US 2016/0023708 A1 Jan. 28, 2016

(30) Foreign Application Priority Data
Mar. 11, 2013 (BE) .................................... 20130157

(51) Int. Cl.
*B62D 61/00* (2006.01)
*B62K 7/04* (2006.01)
*B62J 1/08* (2006.01)
*B62J 7/02* (2006.01)
*B62J 11/00* (2006.01)
*B62K 3/00* (2006.01)
*B62K 5/02* (2013.01)
*B62K 5/025* (2013.01)
*B62K 15/00* (2006.01)
*B62K 11/00* (2006.01)

(52) U.S. Cl.
CPC .. *B62K 7/04* (2013.01); *B62J 1/08* (2013.01); *B62J 7/02* (2013.01); *B62J 11/00* (2013.01); *B62K 3/002* (2013.01); *B62K 5/02* (2013.01); *B62K 5/025* (2013.01); *B62K 11/00* (2013.01); *B62K 15/006* (2013.01); *B62J 2001/085* (2013.01)

(58) Field of Classification Search
CPC ......... B62K 7/04; B62K 5/02; B62K 15/006
See application file for complete search history.

(56) References Cited

U.S. PATENT DOCUMENTS 5,240,267 A * 8/1993 Owsen ..................... B62K 5/10
280/124.103
5,788,254 A * 8/1998 Davis ....................... B62K 5/02
280/261

(Continued)

FOREIGN PATENT DOCUMENTS

EP 2325073 A1 5/2011

OTHER PUBLICATIONS

International Search Report dated Apr. 24, 2014.

*Primary Examiner* — Tony Winner

(57) ABSTRACT

A support system (1) for a cycle (2) having a support surface (9) capable of carrying persons and/or a load, wherein the height adjustment of the support surface (9) is simple and rapid. The support system (1) comprises a base element (5a, 5b) and a support element (6a, 6b), presenting the support surface (9), and the support element (6a, 6b) is rotatably connected to the base element (5a, 5b), such that the support element (6a, 6b) can rotate relative to an axis of rotation (10). The support surface (9) is located a certain distance from said axis of rotation (10) and extends substantially parallel to this axis of rotation (10).

13 Claims, 6 Drawing Sheets

(56) References Cited

U.S. PATENT DOCUMENTS

| | | | |
|---|---|---|---|
| 6,935,649 B2 * | 8/2005 | Lim | B62H 7/00 |
| | | | 280/278 |
| 2005/0077097 A1 * | 4/2005 | Kosco | B62K 5/025 |
| | | | 180/208 |
| 2009/0206588 A1 | 8/2009 | Shaw | |
| 2009/0295127 A1 * | 12/2009 | Wang | B62D 21/14 |
| | | | 280/639 |
| 2013/0306392 A1 * | 11/2013 | Schaap | B62K 3/002 |
| | | | 180/220 |

* cited by examiner

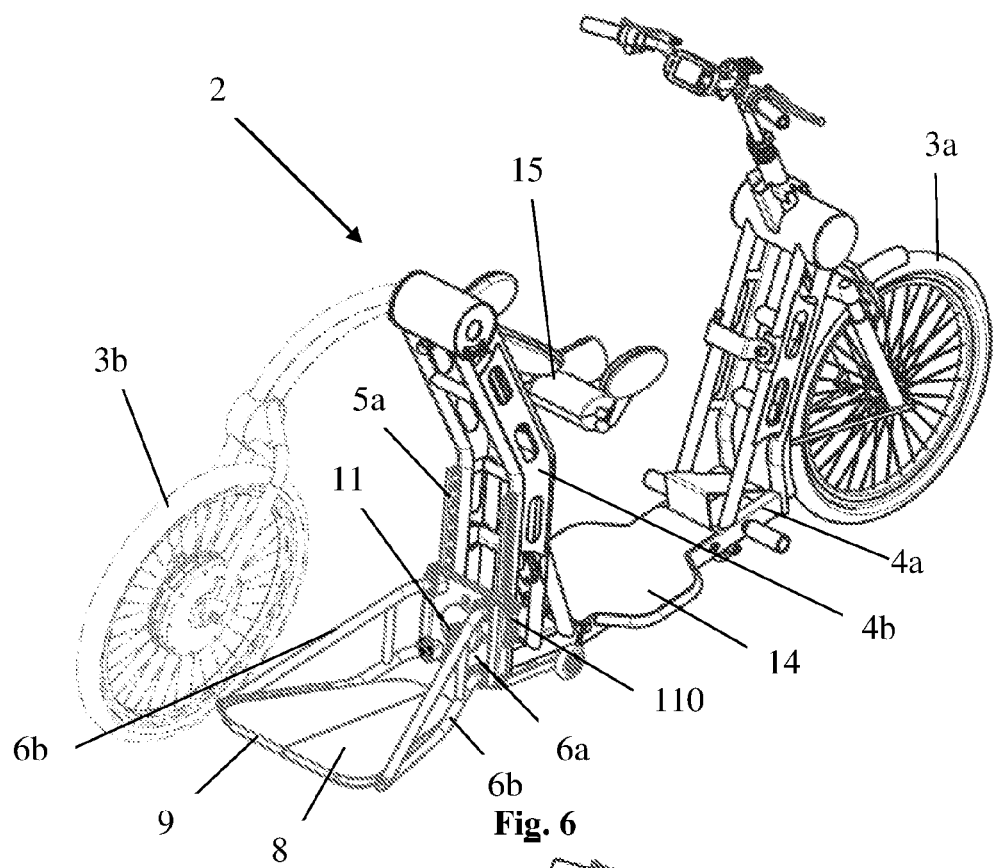
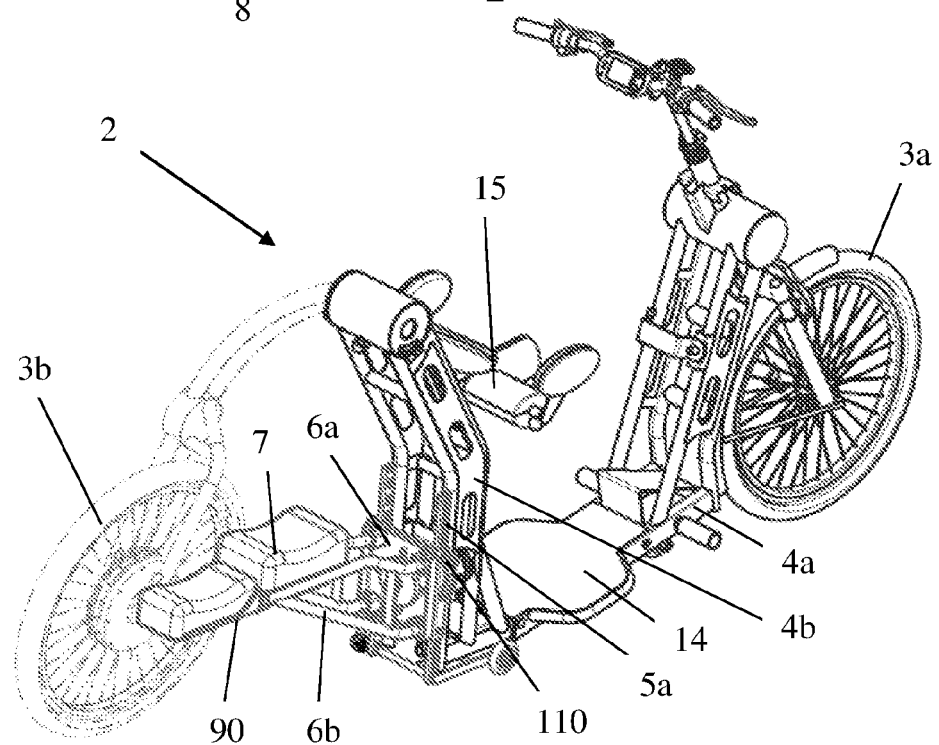

SUPPORT SYSTEM AND CYCLE EQUIPPED WITH THE SUPPORT SYSTEM

This application claims the benefit of Belgian patent application No. BE20130157, filed Mar. 11, 2013, which is hereby incorporated by reference in its entirety.

FIELD OF THE INVENTION

The present invention relates to a support system for a cycle comprising a plurality of wheels and a frame, joining said wheels, wherein the support system comprises:
- a base element forming part of the frame of the cycle or designed to be secured to the frame of the cycle;
- at least a support element serving as a seat or a platform or designed to receive a seat or a platform;

wherein the support element comprises an attachment part, which is rotatably connected to the base element such that the support element can rotate relative to an axis of rotation and wherein the support element, which serves as a seat or a platform, or the seat or the platform secured to the support element, has a support surface that is able to carry one or more persons and/or a load.

The present invention also relates to a cycle for transporting one or more persons, comprising a plurality of wheels, a frame joining the wheels, and a support system.

The longitudinal axis of the cycle is the axis of the conventional direction of movement of the cycle. The longitudinal direction of the cycle is the direction in the conventional direction of movement of the cycle. The conventional direction of movement of the cycle extends substantially parallel to the support plane of the wheels of the cycle. When driving/travelling with a cycle, the support plane of the wheels is normally the surface of the road on which the cycle moves. The direction of height of the cycle (heightwise direction) is the direction that extends perpendicularly to the conventional direction of movement of the cycle and that extends perpendicularly to the support plane of the wheels of the cycle.

BACKGROUND

A cycle, such as a bicycle or tricycle, sometimes has an inadequate amount of support surfaces for transporting a load and/or additional persons. As a consequence, there exist several support systems that can be secured to the frame/chassis of the cycle. The support system can be used as a seat, chair, (loading) platform, and luggage rack, etc. A seat, a chair, a (loading) platform, a luggage rack, etc. may be secured to the support system. A seat, a chair, a platform, a luggage rack, etc. are designed to carry persons and/or a load, more specifically a seat and a chair are designed for persons wanting to sit, a platform is designed to carry a load and persons, and a luggage rack is designed to carry a load.

Today there are several support systems, having a support surface, for cycles comprising a plurality of wheels (scooter, bicycle, tricycle, etc.). These systems are secured to the frame of the cycle, especially to a part of the frame that extends substantially perpendicular to the support plane of the wheels of the cycle. The attachment between the support system and the frame can be located on different parts of the frame, thus the support system can be mounted at different heights according to the direction of height of the cycle, and therefore the height of the support surface is variable. Depending on the height, the support surface of the support system can be used as a seat or a platform. The drawback of the existing systems is that the installation and removal of the support system are complicated and time consuming. Therefore, changing the height of the support surface, and any change in the function of the support surface, are complicated and time consuming.

SUMMARY

The first objective of the invention is therefore to provide a support system wherein the height adjustment of the support surface of the support system is simple and rapid. In this manner, changing the function of the support surface of the support system is also simple and rapid.

The second objective of the invention is to provide a tricycle comprising a support system wherein the height adjustment of the support surface of the support system is simple and rapid. In this manner, changing the function of the support surface of the support system is also simple and rapid.

The first objective can be achieved by providing a support system for a cycle comprising a plurality of wheels and a frame, joining said wheels, wherein the support system comprises
- a base element forming part of the frame of the cycle or designed to be secured to the frame of the cycle;
- at least one support element serving as a seat or a platform or designed to receive a seat or a platform;

wherein the support element comprises an attachment part, which is rotatably connected to the base element such that the support element can rotate relative to an axis of rotation, wherein the support element, which serves as a seat or a platform, or the seat or the platform secured to the support element, has a support surface that is able to carry one or more persons and/or a load, and wherein the support surface is located at a certain distance from the axis of rotation of the support element, the support surface extends substantially parallel to the axis of rotation of the support element and the support surface can occupy at least two positions that are located at a rotation of 180° relative to each other such that when the support system is mounted on a cycle, these positions are located substantially horizontal to the support plane of the wheels of the cycle and one position is located above the other position relative to the heightwise direction of the cycle.

The support system is designed to carry one or more persons and/or a load, and it is limited not only to the support elements serving as a seat or platform or designed to receive a seat or a platform. For example, a support element serving as a luggage rack or designed to receive a luggage rack also falls within the scope of protection of this invention.

Normally, a support surface that is designed to carry one or more persons and/or a load, which forms part of a support system mounted on a cycle, is located substantially horizontal/parallel to the support plane of the wheels of the cycle. In this manner, one or more persons and/or a load is (are) carried by the support surface, and the person(s) and/or the load do(es) not fall on the support plane of the wheels of the cycle, which means that when moving/driving a cycle, the person(s) and/or a load which is carried by the support surface do(es) not fall on the road on which the cycle is moving. Thus the support system according to the invention is mounted on the cycle such that the support surface is located substantially horizontal to the support plane of the wheels of the cycle. The support surface is located at a certain distance from the axis of rotation of the support element and extends substantially parallel to the axis of rotation of the support element. This means that when the support system is mounted on a cycle, the axis of rotation of the support element must extend essentially parallel to the support plane of the wheels of the cycle, and the support surface can occupy two positions that are located substantially horizontal to the support plane of the wheels of the cycle. These two positions are located at a rotation of 180° relative to each other, and one position is located above the other position relative to the direction of height of the cycle. The distance between the two positions is twice the distance between the axis of rotation and the support surface.

With this support system, the support surface can easily and quickly assume two different heights relative to the direction of height of the tricycle. Thus, to change the height of the support surface, it is not necessary to detach the entire support system from the frame of the cycle and attach it at a different height on the frame of the cycle.

Depending on the height of the support surface, the support system can be used as a seat or a platform. Therefore, changing the height of the support surface, and any change in the function of the support system are simple and rapid. For example, in the lowermost position, the support element can serve as a platform, and in the uppermost position, the support element can serve as a seat. For this, the support surface can bear a flexible part on one side and a more rigid part on the other side. Or in the lowermost position, a platform can be mounted on the support element, and a seat can be mounted in the uppermost position. Obviously, the support surface can also be used as a seat, or a seat can be mounted in the lowermost position and the support surface can also be used as a platform, or a platform can be mounted in the uppermost position.

The seat or platform can be retractable. When the support element is designed to receive a seat or a platform, the seat or platform is preferably detachably secured to the support element.

According to a preferred embodiment, the support system comprises locking means for blocking the support element in the desired position relative to the base element. In this manner, there is no risk that the seat or platform rotates relative to the axis of rotation of the support element when the seat or the platform carries persons and/or a load. The locking means preferably comprise a quick release lever. Quick release levers are routinely used, especially to very quickly assemble and disassemble a wheel on a bicycle frame. They are also used in the field of cycles, for example to immobilise the seat in the seat tube. This quick release lever presses the support element against the base element, and the quick release lever can press the support element more or less strongly against the base element. When it is tightened, it presses more strongly and the support element is blocked relative to the base element, when it is loosened, it presses less strongly and the support element can rotate relative to the axis of rotation of the support element.

The support element is preferably foldable. During rotation of the support element, when the support element is secured to the cycle, there must remain a sufficient amount of space so that rotation is not prevented. However, there is not always enough space. If the support element is foldable, it occupies less space in the folded state, the space required for the necessary rotation will thus be smaller.

According to an even more preferred embodiment, the support element comprises a support part, carrying the seat or the platform or designed to receive the seat or the platform, and wherein the support part is detachably connected to said attachment part. A first advantage of this is that the support part can be detached if there is not enough space to rotate the support element. In this manner, the part of the support element that turns during the rotation is smaller, so there is less space needed to perform the rotation. Once the desired rotation is completed, the support part can be reattached to the rest of the support element. The combination of the support part and the seat, or the combination of the support part and the platform may thus be larger in size and occupy more space compared with an embodiment of a support system wherein the support element does not include a detachable part.

A second advantage is that, if a seat or platform is not needed, the support part can be disassembled. In this manner, it is not necessary to fully disassemble the support system. The connection between the support system and the frame of the cycle is generally difficult to establish and separate because it must be a very strong connection.

A third advantage is that it becomes possible to connect different support parts with the rest of the support element depending on the platform or the seat that is needed.

In a preferred embodiment, the support element comprises two branches, which are connected to said attachment part, and said two branches carry the seat or the platform or are designed to receive the seat or the platform. The branches may or may not be detachably connected to the attachment part. The advantage of the branches is that it is possible to manufacture them using a resistant material. It is thus possible to obtain compact branches that nevertheless provide a sufficient carrying force.

More preferably, the branches are pivotally connected to the attachment part, such that each branch can rotate relative to an axis of rotation that extends substantially perpendicular to the support surface. In this manner, the branches can move towards each other or away from each other and carry seats and platforms of various dimensions. In principle, two branches that are close to each other can centrally carry a large surface, however, it is preferable that the branches carry the sides of the large surface. If the branches carry the side of a large surface, the branches occupy a great deal of space during the rotation of the support element relative to the axis of the support element. The branches occupy less space if the branches are brought towards each other prior to the rotation of the support element relative to the axis of rotation of the support element.

Ideally, the seat or the platform, which is carried by said two branches, is foldable, such that when each branch is rotated towards one other, the seat or the platform folds. In this manner, it is not necessary to separate the seat or the platform from the branches when moving the branches towards each prior to the rotation of the support element relative to the axis of the support element. After the rotation, the branches can be moved away from each other, resulting in automatic deployment of the seat or the platform. In the unfolded state, the seat or the platform has a support surface that can carry one or more persons and/or a load.

In a particularly preferred embodiment, the base element comprises a first part of the base element that is part of the frame of the cycle or designed to be secured to the frame of the cycle, and a second part to which the support element is rotatably connected, the second part of the base element being connected in an adjustable heightwise manner to the first part of the base element. "The second part of the base element is connected in an adjustable heightwise manner to the first part of the base element" means that when the support system is attached to the cycle, the second part of the base element is adjustable, according to the direction of height of the tricycle, with the first part of the base element. In this manner, the height of the support surface is not only adjustable by the rotation of the support element relative to the axis of rotation of the support element. The height of the support surface can also be adjusted by adapting the height of said second part of the base element relative to said first part of the base element.

Preferably, the base element comprises locking means for blocking said second part of the base element at the desired height relative to the first part of the base element. In this manner, there is no risk that the height of said second part of the base element, and therefore the height of the seat or the platform, changes when the seat or the platform carries persons or a load. The locking means are preferably quick release levers. These quick release levers press the second part of the base element against the first part of the base element, and can press the second part of the base element more or less strongly against the first part of the base element. When they are tightened, they exert greater pressure and the second part of the base element is blocked relative to the first part of the base element, when they are loosened, they exert less pressure and the second part of the base element can move relative to the first part of the base element.

More preferably, the first part of the base element comprises two rails, which extend parallel to one other at equal distances from the axis of rotation of the support element and which extend substantially perpendicular to the support plane of the wheels of the cycle and the second part of the base element comprises a mounting plane and is slidably connected to the rails. The second part of the base element comprises a mounting plane and is slidably connected to the rails, so if the second part of the base element slides relative to the rails, it slides in the heightwise direction of the tricycle. Consequently, adaptation of the height of the second part of the base element relative to the first part of the base element, the rails, is very simple. The height adjustment of the second part of the base element, and therefore the height of the support surface, can thus be performed very quickly.

Ideally, the second part of the base element covers only a part of the rails, such that an additional seat or an additional platform may be secured to the rails. In this manner, it is possible to carry more persons and/or a load if needed. The additional seat or the additional platform can be easily connected to the rails. In a specific embodiment, the additional seat or the additional platform cannot rotate relative to an axis of rotation that extends parallel to the support plane of the wheels of the cycle.

The additional seat or the additional platform can be connected to the rails in a more complex manner. For example, the support system can comprise:
 a base element comprising two rails and two mounting planes;
 two support elements, serving as a seat and an additional chair/platform or serving as a platform and an additional seat/platform, or designed to receive a seat and an additional seat/platform or designed to receive a platform and an additional seat/platform;
wherein the support elements are support elements that are rotatable relative to mounting planes, as described above.

According to a specific embodiment of the invention, the support element serves as a seat or is designed to receive a seat, where the seat has two support surfaces, wherein the second support surface is pivotally connected to the first support surface such that the second support surface can assume at least two positions, wherein, in a first position, the two support surfaces extend consecutively along the direction of the axis of rotation of the support element and are available to carry one or more persons and/or a load and, in a second position, the second support surface is located below the first surface and only the first support surface is available to carry one or more persons and/or a load. In the first position, the two support surfaces are available for carrying one or more persons and/or a load. This means that the two support surfaces extend substantially parallel to the support plane of the wheels of the cycle. Depending on the number of persons or load that is to be carried, one or both support surfaces may be chosen. This prevents available support surfaces from being unused.

The second objective of the invention can be achieved by producing a cycle for transporting one or more persons, comprising a plurality of wheels, a frame, joining the wheels and a support system as described above, wherein the axis of rotation of the support element extends substantially in the longitudinal direction of the cycle.

In this manner, the support surface can be located horizontal to the support plane of the wheels of the cycle.

Preferably, the cycle is a tricycle, comprising:
 a front wheel, arranged substantially in the longitudinal axis of the tricycle;
 two rear wheels;
 a frame joining the wheels;
and wherein the support surface is located between the planes formed by the rear wheels and remains within the lengthwise dimension of the tricycle.

A tricycle is more stable than a bicycle. Since it is more stable, it can carry more weight. It is easier to carry a load and/or additional persons with a tricycle. The support surface of this preferred embodiment of the invention is located between the planes formed by the rear wheels and remains within the lengthwise dimension of the tricycle. The stability of the tricycle is thus not compromised by the load and/or the additional persons carried by the support surface as the weight of the load and/or persons is carried between the dimensions of the tricycle.

BRIEF DESCRIPTION OF THE DRAWINGS

The present invention will now be explained in greater depth based on the following description of a support system according to the invention and several tricycles according to the invention. The purpose of this description is exclusively to give an illustrative example of the invention and to indicate further advantages and details of support systems and tricycles according to the invention, and may thus in no way be interpreted as a limitation of the scope of application of the invention or of the patent rights requested in the claims.

This detailed description will use reference numerals to refer to the appended drawings, wherein:

FIG. 6 is a perspective view of the tricycle, which is shown in FIGS. 2 to 5, wherein the branches carry a platform, and wherein the position of the support element rotates 180° relative to the support element shown in FIG. 4;

FIG. 7 is a perspective view of the tricycle, shown in FIGS. 2 to 6, wherein the branches carry a seat having two support surfaces, and wherein the seat is in a first position;

DETAILED DESCRIPTION OF EMBODIMENTS

Figure 1:
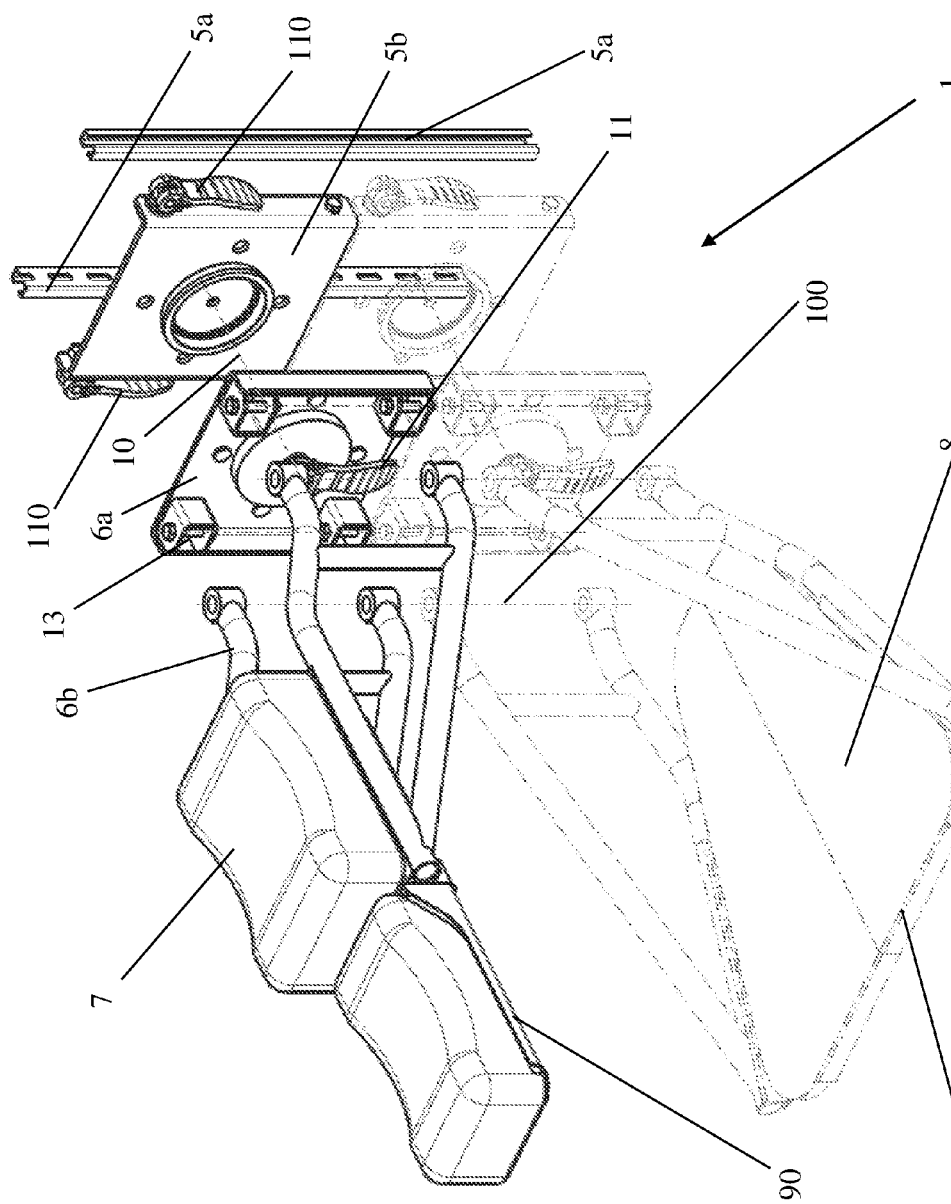
FIG. 1 is an exploded perspective view of one embodiment of a support system according to the invention, wherein the support system comprises branches for receiving a seat or a platform, and wherein the support system carries a seat (solid line) or a platform (broken line)

The embodiment of the support system (1), shown in FIG. 1, is adapted to be mounted to cycles (2) comprising a plurality of wheels (3a, 3b) and a frame (4a, 4b) connecting said wheels (3a, 3b).

The system can be seen attached to a tricycle (2) in FIGS. 2 to 9. However, the invention is not limited to tricycles (2). The tricycle (2), shown in FIGS. 2 to 9, comprises a front wheel (3a), arranged substantially in the longitudinal axis of the tricycle (2), two rear wheels (3b), arranged laterally on opposite sides relative to the longitudinal axis of the tricycle (2), and a frame (4a, 4b) joining the wheels (3a, 3b). The support surface (9) is located between the planes formed by the rear wheels (3b) and remains within the lengthwise dimension of the tricycle (2).

In FIGS. 2 to 9, only one rear wheel (3b) is represented, and the rear wheel (3b) is carried by an arm of the frame (4a, 4b) of tricycle (2). The reason is that the not shown arm of the frame (4a, 4b) of the tricycle (2), which carries the other rear wheel (3b), would constitute an obstacle that would impede the view of the support system (1), since the support system (1) lies between the arms of the frame (4a, 4b) of the tricycle (2). The support system (1) is located between the arms of the frame (4a, 4b) of the tricycle (2), thus the support surface (9) lies between the dimensions of the tricycle (2), whereby as a result the tricycle (2) is very stable.

The frame (4a, 4b) of the tricycle (2) comprises a first part (4a) that carries the footrest (14), and an arcade (4b) that extends perpendicularly to the support plane of the wheels (3a, 3b) of the tricycle (2) and that carries an ischiatic support (15). The support system (1) is also secured to the arcade (4b) of the frame (4a, 4b) of the tricycle (2). The driver of the tricycle (2) normally bears against the ischiatic support (15) and the footrest (14). The driver of a tricycle (2) is thus positioned between the front wheel (3a) and rear wheels (3b). According to the conventional direction of movement of the tricycle (2), the driver is located in front of the support surface (9), therefore persons and/or a load carried by the support surface (9) do not obstruct the driver's view.

The tricycle (2), shown in FIGS. 2 to 9, is more specifically a tricycle (2) that is propelled either by pushing off the ground with the foot, or by a motor. However, other tricycles (2) are possible.

The support system (1) shown in the figures comprises a base element (5a, 5b) that is designed to be secured to the arcade (4b) of the frame (4a, 4b) of the tricycle (2), and a support element (6a, 6b) that is designed to detachably receive a seat (7) or a platform (8). Of course, the arcade (4b) may be adapted such that the base element (5a, 5b) forms part of the arcade (4b) of the frame (4a, 4b), and the support element (6a, 6b) can also serve as a seat (7) or a platform (8). The support element (6a, 6b) comprises an attachment part (6a), namely a mounting plate (6a), which is rotatably connected to the base element (5a, 5b), such that the support element (6a, 6b) can rotate relative to an axis of rotation (10). The seat (7) and the platform (8) have a support surface (9) able to carry one or more persons and/or a load, in addition to the driver. When the seat (7) or the platform (8) is mounted on the support element (6a, 6b), the support surface (9) is located a certain distance from the axis of rotation (10) of the support element (6a, 6b) and extends substantially parallel to the axis of rotation (10) of the support element (6a, 6b). This axis of rotation (10) of the support element (6a, 6b) extends substantially parallel to the support plane of the wheels (3a, 3b) of the tricycle (2), due to the fact that the support surface (9) must extend substantially parallel to the moving direction of the conventional tricycle (2).

Because the support surface (9) is at a distance from the axis of rotation (10) of the support element (6a, 6b) and extends substantially parallel to the axis of rotation (10) of the support element (6a, 6b), when the support system (1) is mounted on the tricycle (2), the support surface (9) can occupy two positions that are located substantially horizontal to the support plane of the wheels (3a, 3b) of the tricycle (2). These two positions are located at a rotation of 180° relative to each other, and one position is located above the other position relative to the heightwise direction of the tricycle (2). The distance between the two positions is twice the distance between the axis of rotation (10) of the support element (6a, 6b) and the support surface (9). This means that it is possible to easily switch between two different heights for the support surface (9) without having to disconnect and reconnect the entire support system (1). Depending on the height of the support surface (9) and/or according to the desired function, the support system (1) may include a seat (7) or a platform (8). Nevertheless, a luggage rack can also be mounted on the support system (1).

The base element (5a, 5b) comprises two rails (5a) and a mounting plate (5b), having a mounting plane. The rails (5a) are secured to the arcade (4b) of the frame (4a, 4b) of the tricycle (2) such that the rails (5a) extend parallel to each other at equal distances from the axis of rotation (10) of the support element (6a, 6b), and extend substantially perpendicular to the support plane of the wheels (3a, 3b) of the tricycle (2). The rails (5a) thus extend according to the heightwise direction of the tricycle (2). The rails (5a) are inseparably attached to the arcade (4b) of the frame (4a, 4b) of the tricycle (2). The rails (5a) can of course be secured to said arcade (4b) in another manner, such as with bolts, for example. Here the shape of said arcade (4b) is adapted to the rails (5a) such that said arcade (4b) comprises two bars to which the rails (5a) are welded. Alternatively, the arcade (4b) of the frame (4a, 4b) of the tricycle (2) may also comprise two rails designed to serve as rails (5a) for the base element (5a, 5b).

The mounting plate (5b), which presents the mounting plane, is slidably connected to the rails (5a), and said mounting plate (5b) covers only a part of the rails (5a), such that an additional seat (12) or an additional platform can be secured to the rails (5a). The height of the mounting plane can thus be adjusted by sliding the mounting plate (5b) relative to the rails (5a). The attachment part (6a) of the support element (6a, 6b) is rotatably connected to the mounting plane, thus, when the height of the mounting plane changes, the height of the attachment part (6a), and therefore the height of the support surface (9), also change. It is thus easy to change the height of the support surface (9) that is mounted on the support element (6a, 6b) by sliding the mounting plate (5b) relative to the rails (5a).

The base element (5a, 5b) comprises quick release levers (110) to block the mounting plate (5b) at the desired height relative to the rails (5a). The quick release levers (110) press the mounting plate (5b) against the rails (5a).

As described above, it is also possible to change the height of the support surface (9) by rotating the support element (6a, 6b) relative to the axis of rotation (10) of the support element (6a, 6b). The support element (6a, 6b) can be rotated relative to the axis of rotation (10) of the support element (6a, 6b), because the attachment part (6a) of the support element (6a, 6b) is rotatably connected to the mounting plane of the base element (5a, 5b). The axis of rotation (10) of the support element (6a, 6b) is a solid axis of rotation that is formed by the quick release lever (11) that presses the mounting plate (5b) against the attachment part (6a). The rotation of the support element (6a, 6b) and the connection between the attachment part (6a) and the mounting plate (5b) are facilitated by the fact that the mounting plane has a hollow cylindrical protruding part, and the attachment part (6a) has a cylindrical cavity wherein the protruding part fits, and the shape of the protruding part of the mounting plane is adapted to the shape of the cavity of the attachment part (6a). A quick release lever (11) of the quick release type is used to block the attachment part (6a) in the desired position relative to the mounting plane. The quick release lever (11) presses the attachment part (6a) against the mounting plane.

Depending on the desired function, it is possible to mount a seat (7) to the support element (6a, 6b), or to secure a platform (8) to the support element (6a, 6b).

Figure 9:
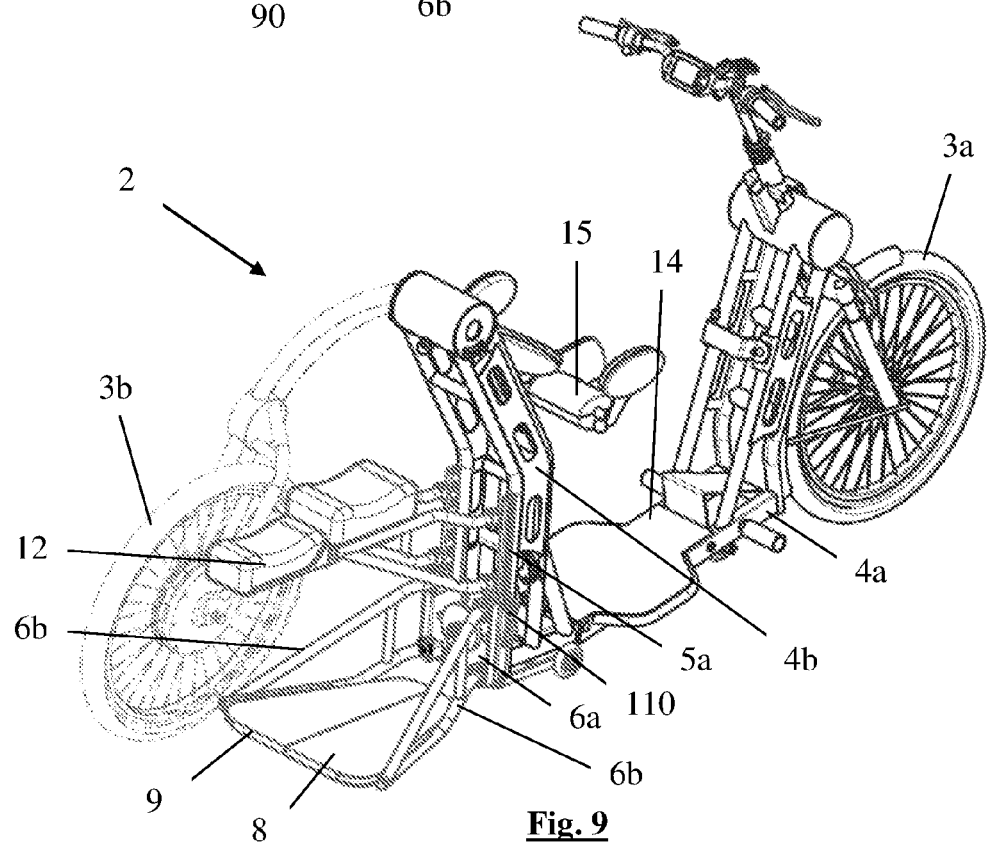
FIG. 9 is a perspective view of the tricycle, shown in FIGS. 2 to 8, wherein the support system carries a platform and an additional seat.

FIG. 9 shows a tricycle (2) comprising a support system (1) according to the invention, wherein the support system (1) carries a platform (8). The support system (1) also carries an additional seat (12), where the additional seat (12) is attached to the rails (5a). The additional seat (12) is not rotatably connected to the rails (5a), however it is also possible to rotatably connect an additional seat (12) or an additional platform to the rails (5a). The tricycle (2), shown in FIG. 9, is designed to carry three persons, namely the driver and two persons on the additional seat (12), and is designed to carry a load on the platform (8). Of course, other tricycles (2) according to the invention can be designed to carry 4 or 5 persons.

Figure 2:
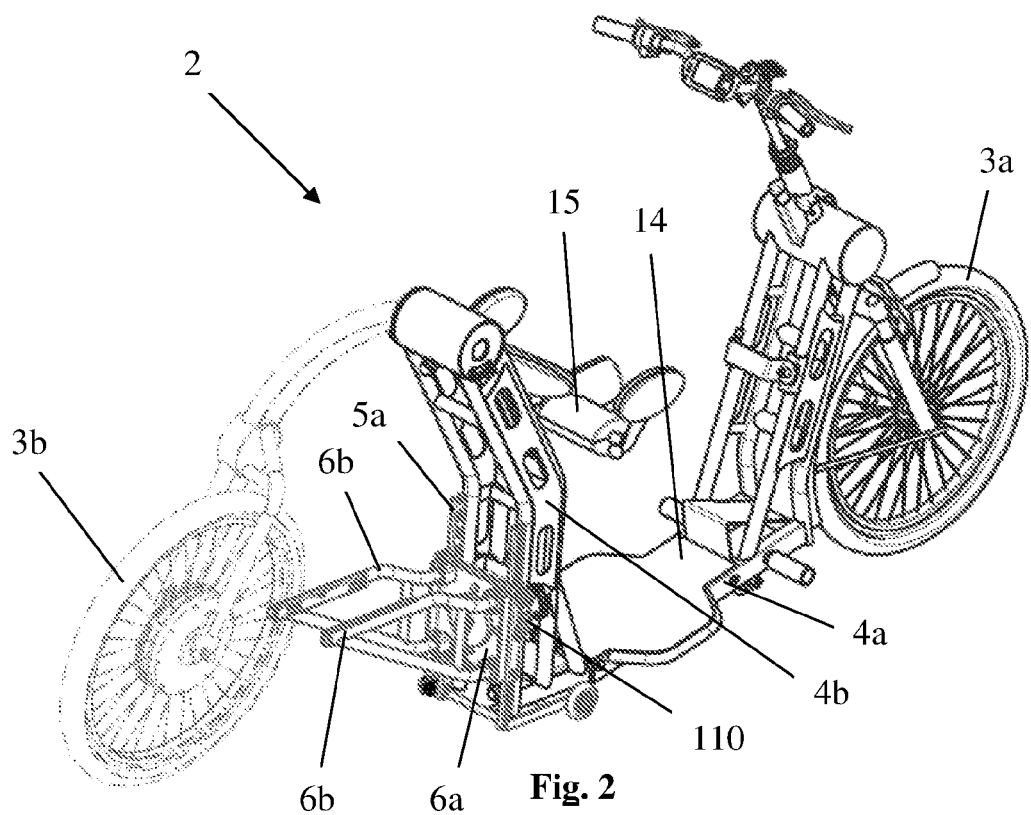
FIG. 2 is a perspective view of one embodiment of a tricycle according to the invention comprising the support system shown in FIG. 1.
Figure 3:
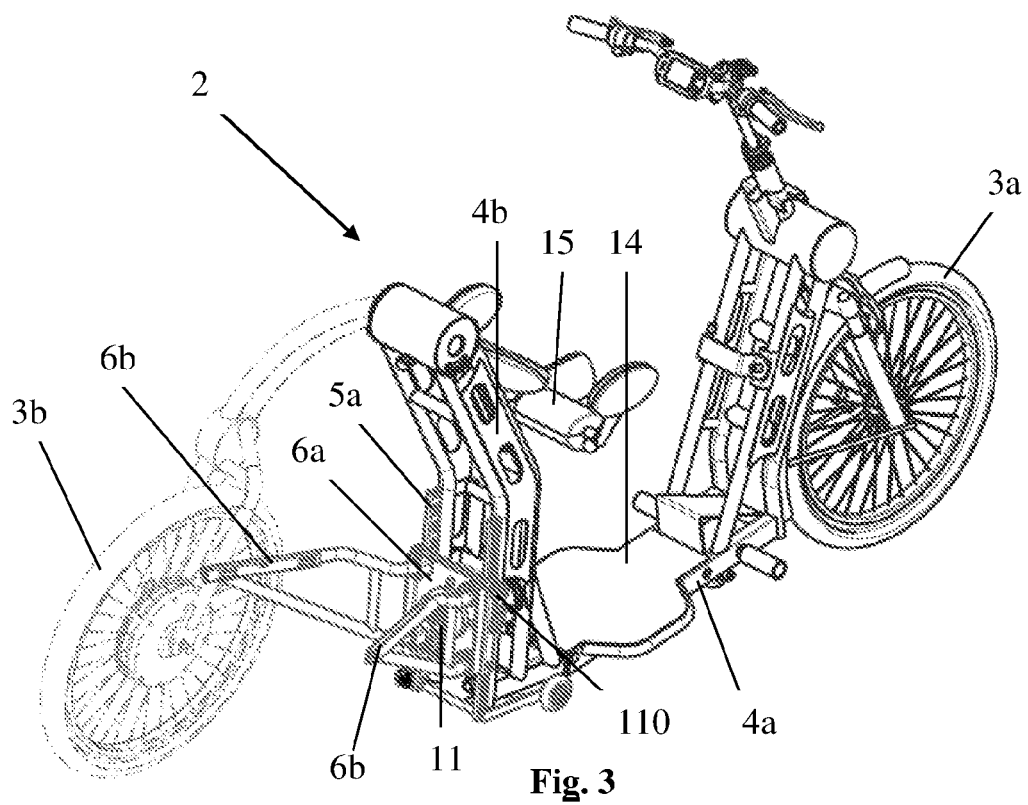
FIG. 3 is a perspective view of the tricycle shown in FIG. 2, wherein the positions of the branches differ from the positions of the branches shown in FIG. 2.
Figure 4:
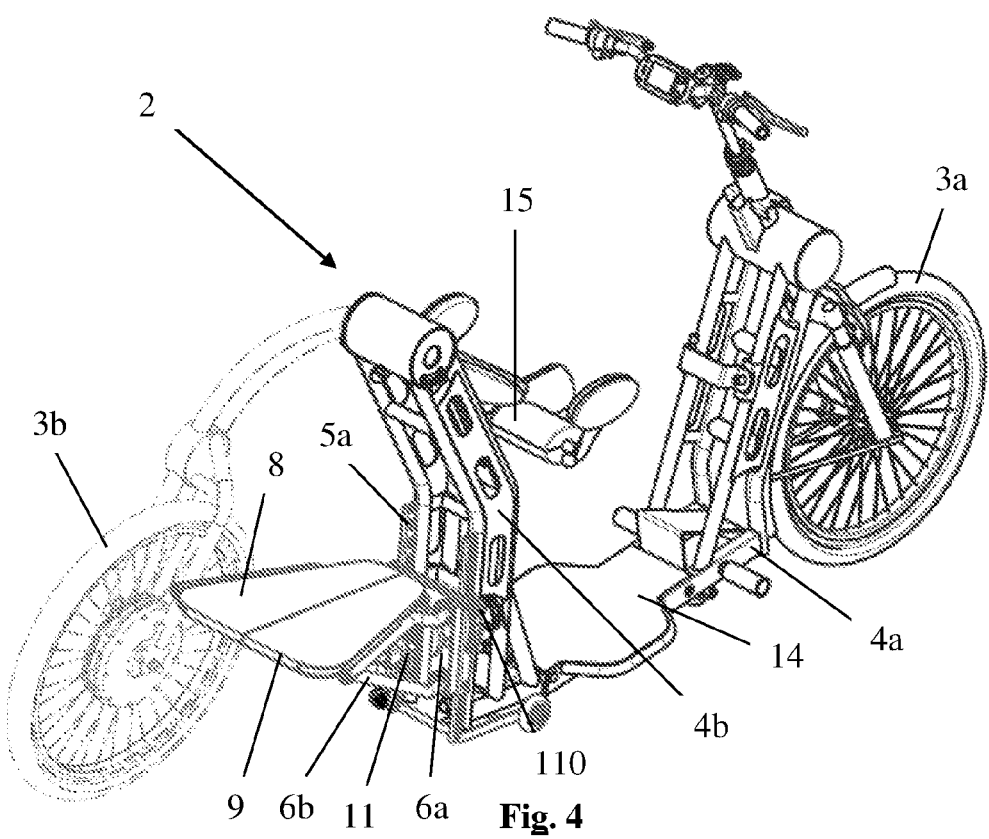
FIG. 4 is a perspective view of the tricycle, shown in FIGS. 2 and 3, wherein the branches carry a platform.
Figure 5:
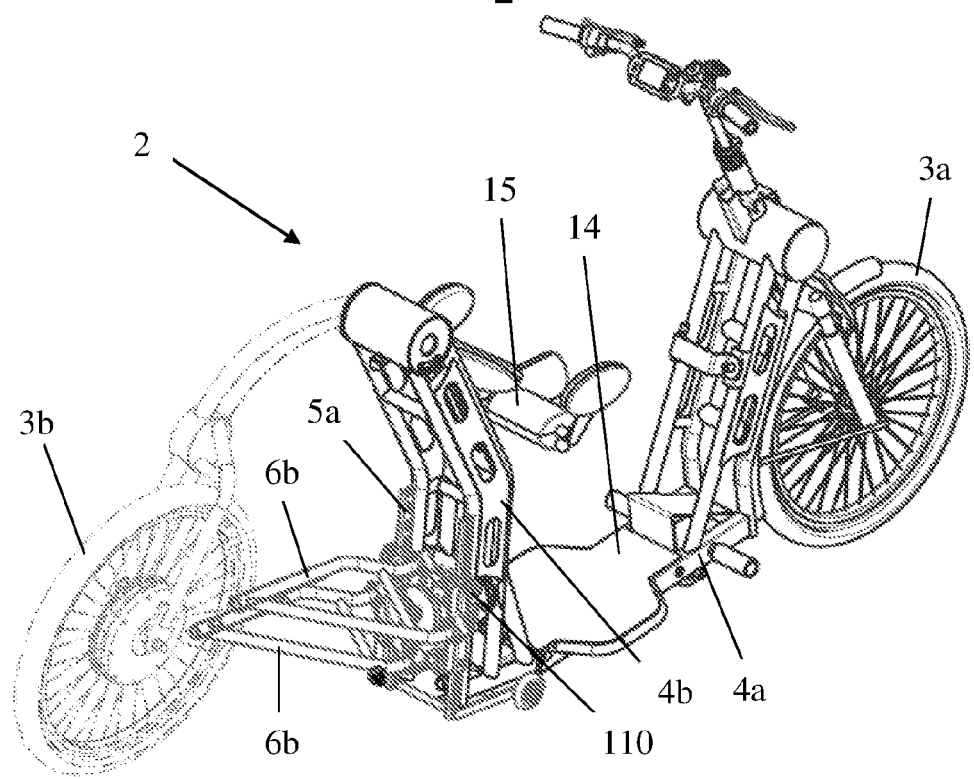
FIG. 5 is a perspective view of the tricycle shown in FIGS. 2 to 4, during the rotation of the support element relative to the axis of rotation of the support element.

The support element (6a, 6b) comprises branches (6b) that are connected to the attachment part (6a). The part of the branches (6b) that carries the seat (7) or the platform (8) extends substantially parallel to the axis of rotation (10) of the support element (6a, 6b). In addition, the branches (6b) are rotatably connected to the attachment part (6a). Each branch (6b) can rotate relative to an axis of rotation (100) that extends perpendicularly to the plane of the support surface (9). FIGS. 2 and 3 clearly show two different positions of the branches (6b). In FIG. 2, the branches (6b) are parallel relative to one another, and are designed to receive a seat (7), as shown in FIG. 7, or a rectangular platform (8). In FIG. 3, each branch (6b) has rotated away from the other relative to the axis of rotation (100) of each leg (6b). The branches (6b) shown in FIG. 3 are designed to receive a platform (8), as shown in FIG. 4. The platform (8), shown in FIG. 4, has a support surface (9) that is greater than the support surface (9) of the seat (7) shown in FIG. 7. The position of the branches (6b) shown in FIG. 2 makes it easier to rotate the support element (6a, 6b) relative to the axis of rotation (10) of the support element (6a 6b) compared to the position of the branches (6b) shown in FIG. 3, because the branches (6b) in the position shown in FIG. 2 takes up less space when they rotate relative to the axis of rotation (10) of the support element (6a, 6b).

To further facilitate the rotation of the support element (6a, 6b) relative to the axis of rotation (10) of the support element (6a, 6b), the branches (6b) are detachably connected the attachment part (6a). In this manner, it is possible to detach the branches (6b) before rotating the attachment part (6a) relative to the axis of rotation (10) of the support element (6a, 6b), and thus less space is required to allow said rotation. Once said rotation has been performed, the branches (6b) can be attached to the attachment part (6a). The branches (6b) are connected to the attachment part (6a) by means of bolts (13). Of course, other connections are also possible.

An additional advantage of the detachable branches (6b) is that if a support system (1) is not needed, the branches (6b) can simply be detached. This is easier than removing the entire support system (1). Furthermore, the branches (6b), as shown in the figures, occupy the largest space of the support system (1), thus if the branches (6b) are detached, the remaining parts of the support system (1) do not occupy much space and do not interfere. If after a certain time a complete support system (1) is required, one simply has to attach the branches (6b) to the attachment part (6a).

Given that the branches (6b) are detachably connected to the attachment part (6a), it is thus possible to secure branches (6b) of different dimensions to the attachment part (6a).

Figure 8:
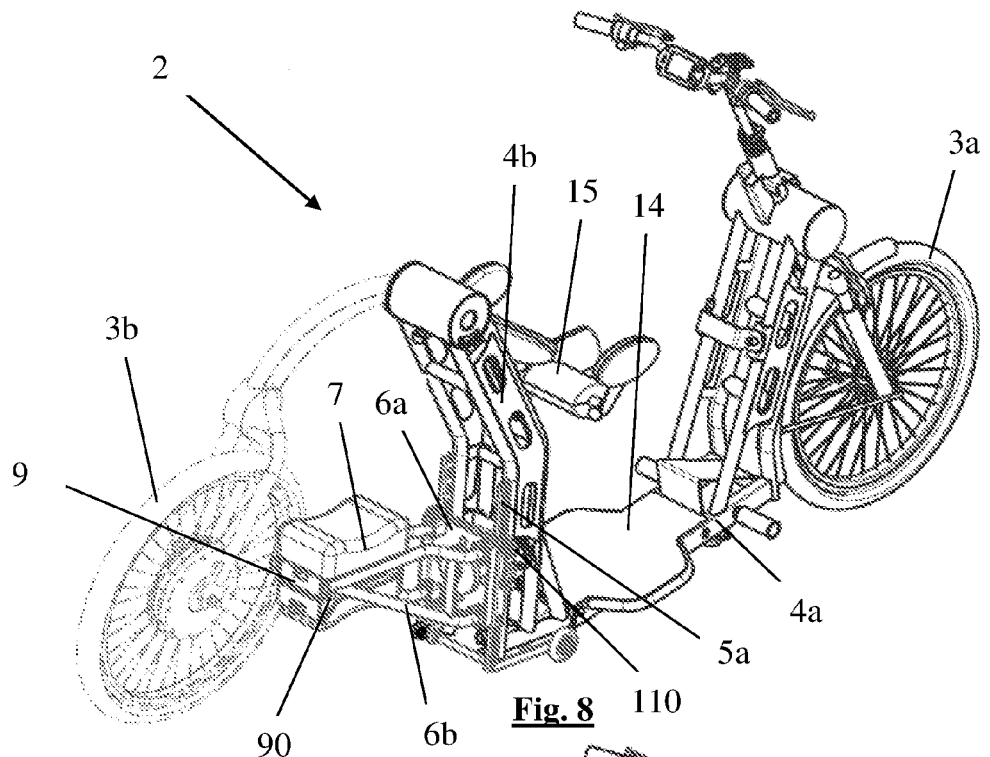
FIG. 8 is a perspective view of the tricycle, shown in FIGS. 2 to 7, wherein the branches carry a seat comprising two surfaces, and wherein the seat is in a second position.

The seat (7) that is secured to the branches (6b), as shown in FIGS. 1, 7 and 8, has two support surfaces (9, 90), where the second support surface (90) is pivotally connected to the first support surface (9), such that the second support surface (90) can assume at least two positions, wherein, in a first position, as shown in FIGS. 1 and 7, the two support surfaces (9, 90) extend consecutively along the direction of the axis of rotation (10) of the support element (6a, 6b), are available to carry one or more persons and/or a load and extend substantially parallel to the axis of rotation (10) of the support element (6a, 6b). In a second position, the second support surface (90) is located below the first support surface (9), and only the first support surface (9) is available to carry one or more persons and/or a load. Depending on the number of persons or load that is to be carried, it is possible to provide one or two support surfaces (9, 90) able to carry persons and/or a load. Here, in the first position, the seat (7) is designed to carry two persons. The tricycle (2), shown in FIG. 7, is thus designed to carry three persons. And, in the second position, the seat (7) is designed to carry one person, thus the tricycle (2) shown in FIG. 8 is designed to carry two persons. It is possible to switch between said two positions depending on the number of persons to be transported with the tricycle (2).

Alternatively, the seat (7) may have a plurality of support surfaces (9, 90), where the support surfaces (9, 90) cannot assume more than one position. In this position, all the support surfaces (9, 90) are available to carry persons/a load, and the support surfaces (9, 90) extend substantially parallel to the axis of rotation (10) of the support element (6a, 6b). Here, however, it is impossible to change the support surfaces (9, 90) available depending on the number of persons to be transported with the tricycle (2) equipped with this seat (7).

Figure 10:
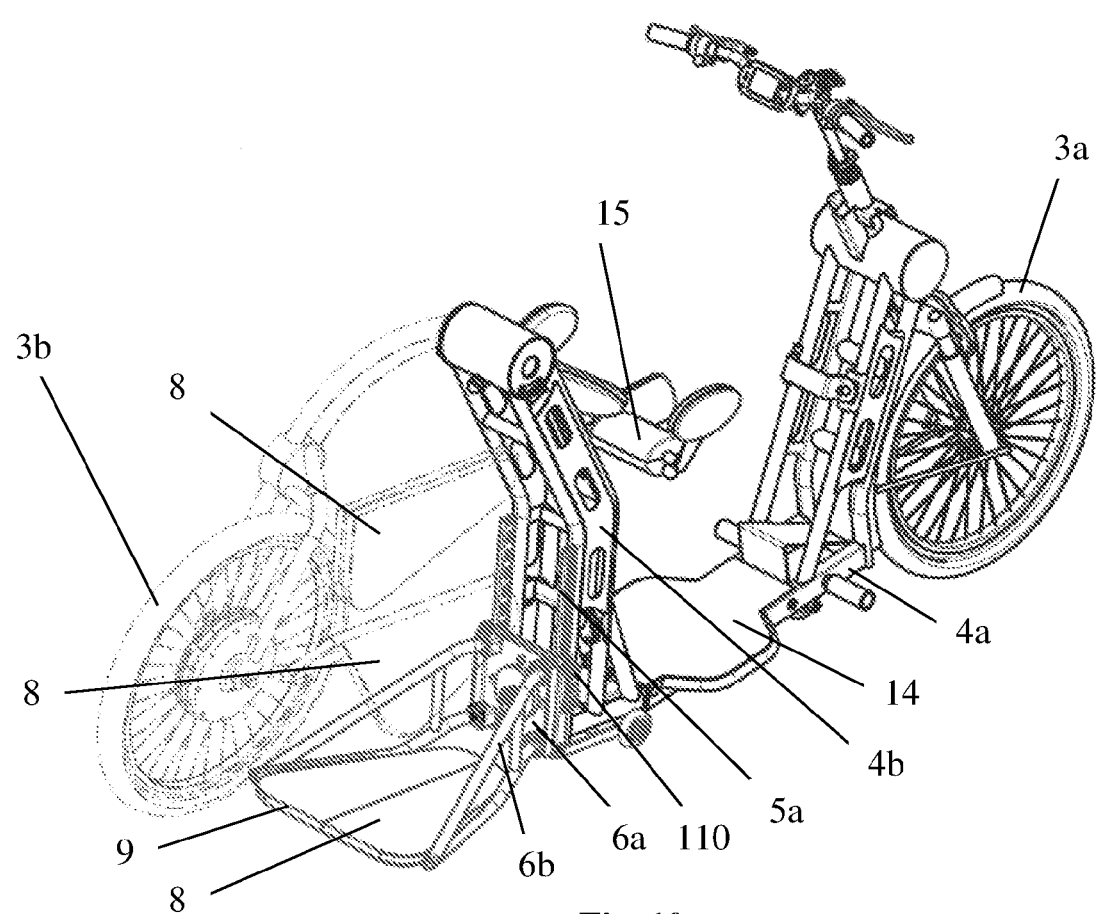
FIG. 10 is a perspective view of the tricycle, shown in FIGS. 2 to 9, wherein the branches have a folding platform, and wherein different folding modes are shown.

The platform (8) that is secured to the branches (6b) is foldable, as shown in FIGS. 1, 4, 6 and 9. In its unfolded state, the platform (8) occupies a great deal of space during rotation of the platform (8) relative to the axis of rotation (10) of the support element (6a, 6b). Often, the space available is insufficient for said rotation. When the platform (8) cannot be folded, the platform (8) must first be separated from the branches (6b), and then each branch (6b) must be brought towards one another before carrying out the rotation. Here, however, the platform (8) can be folded, such that when each branch (6b) is rotated towards one other, the platform (8) folds, as shown in FIG. 10. In this manner, the platform (8) does not need to be separated from the branches (6b) when one wants to move the branches (6b) towards each other before rotating the support element (6a, 6b) relative to the axis of rotation (10) of the support element (6a, 6b). After the rotation, the branches (6b) can be spread away from one other, resulting in the automatic deployment of the platform (8), and the platform (8) has a support surface (9) extending substantially parallel to the axis of rotation (10) of the support element (6a, 6b) and which is designed to carry one or more persons and/or a load.

The platform (8), secured to the branches (6b), can also be equipped with wheels (not shown in the figures). This is useful when the platform (8) is in contact with the road on which the tricycle (2) is moving, with these wheels. Owing to these wheels, the platform (8) is supported not only by the support system (1), but also by the wheels. In this manner, a greater amount of weight can be loaded onto the platform (8).

The invention claimed is:

1. A support system for a cycle comprising a plurality of wheels and a frame, joining said plurality of wheels, wherein the support system comprises:
    a base element forming part of the frame of the cycle or secured to the frame of the cycle;
    at least one support element serving as a support surface or configured to receive the support surface;
    wherein the support element comprises an attachment part, which is rotatably connected to the base element, such that the support element can rotate relative to an axis of rotation, and wherein the support element is able to carry one or more persons or a load;
    wherein the support surface is located at a certain distance from the axis of rotation of the support element, the support surface extends substantially parallel to the axis of rotation of the support element and the support surface is configured to occupy at least two different positions such that when the support system is mounted on the cycle these positions are located substantially horizontal to a support plane of the wheels of the cycle and one position is located above the other position relative to a heightwise direction of the cycle;
    wherein the base element comprises a first part of the base element that is part of the frame of the cycle or is designed to be secured to the frame of the cycle, and a second part to which the support element is rotatably connected, the second part of the base element being connected in an adjustable heightwise manner to the first part of the base element.

2. The support system according to claim 1, wherein the support system comprises a locking mechanism for blocking the support element in the desired position relative to the base element.

3. The support system according to claim 1, wherein the support element is foldable.

4. The support system according to claim 1, wherein the support element comprises a support part carrying the support surface or configured to receive the support surface, and wherein the support element is detachably connected to said attachment part.

5. The support system according to claim 1, wherein the support element comprises two branches which are connected to said attachment part, and said two branches carry the support surface or are configured to receive the support surface.

6. The support system according to claim 5, wherein the two branches are pivotally connected to the attachment part, such that each of the two branches is configured to rotate relative to the axis of rotation that extends substantially perpendicular to the support surface.

7. The support system according to claim 6, wherein the support surface, which is carried by said two branches, is foldable such that when the two branches are rotated towards one another, the support surface folds.

8. The support system according to claim 1, wherein the second part of the base element covers only part of the rails, such that an additional support surface is configured to be secured to the rails.

9. The support system according to claim 1, wherein the base element comprises a locking mechanism for blocking said second part of the base element at a desired height relative to the first part of the base element.

10. The support system according to claim 1, wherein the first part of the base element comprises two rails that extend parallel to one another at equal distances from the axis of rotation of the support element, and which extend substantially perpendicular to the support plane of the plurality of wheels of the cycle and the second part of the base element comprises a mounting plane and is slidably connected to the rails.

11. A support system for a cycle comprising a plurality of wheels and a frame, joining said plurality of wheels, wherein the support system comprises:
    a base element forming part of the frame of the cycle or designed to be secured to the frame of the cycle;
    at least one support element serving as a support surface or configured to receive the support surface;
    wherein the support element comprises an attachment part, which is rotatably connected to the base element, such that the support element can rotate relative to an axis of rotation, and wherein the support element is able to carry one or more persons or a load;
    wherein the support surface is located at a certain distance from the axis of rotation of the support element, the support surface extends substantially parallel to the axis of rotation of the support element and the support surface is configured to occupy at least two different positions such that when the support system is mounted on a cycle these positions are located substantially horizontal to a support plane of the wheels of the cycle and one position is located above the other position relative to a heightwise direction of the cycle;
    wherein the support element serves as a seat or is designed to receive a seat, where the seat has two support surfaces, wherein the second support surface is pivotally connected to the first support surface, such that the second support surface can assume at least two positions, wherein, in a first position, the two support surfaces extend consecutively along the direction of the axis of rotation of the support element and are available to carry one or more persons or a load and, in a second position, the second support surface is located below the first surface, and only the first support surface is available to carry one or more persons or a load.

12. A cycle for transporting one or more persons, comprising a plurality of wheels, a frame joining the wheels and a support system, wherein the support system comprises:
   a base element forming part of the frame of the cycle or designed to be secured to the frame of the cycle;
   at least one support element serving as a support surface or configured to receive the support surface;
   wherein the support element comprises an attachment part, which is rotatably connected to the base element, such that the support element can rotate relative to an axis of rotation, and wherein the support element is able to carry one or more persons or a load;
   wherein the support surface is located at a certain distance from the axis of rotation of the support element, the support surface extends substantially parallel to the axis of rotation of the support element and the support surface is configured to occupy at least two different positions such that when the support system is mounted on a cycle these positions are located substantially horizontal to a support plane of the wheels of the cycle and one position is located above the other position relative to a heightwise direction of the cycle;
   and wherein the axis of rotation of the support element extends substantially in the longitudinal direction of the cycle.

13. The cycle according to claim 12, wherein the cycle is a tricycle, comprising:
   a front wheel of the plurality of wheels arranged substantially in the longitudinal axis of the tricycle;
   two rear wheels of the plurality of wheels; and
   a frame joining each of the plurality of wheels,
   and wherein the support surface is located between the planes formed by the rear wheels and remains inside the lengthwise dimension of the tricycle.

\* \* \* \* \*